(12) United States Patent
Moschopoulos et al.

(10) Patent No.: US 10,948,970 B2
(45) Date of Patent: Mar. 16, 2021

(54) LOW POWER MICROCONTROLLER

(71) Applicant: Dialog Semiconductor B.V., s-Hertogenbosch (NL)

(72) Inventors: Nikolaos Moschopoulos, Athens (GR); Konstantinos Georgios Kottikas, Palaio Faliro (GR); Dimitrios Bekiaris, Kallithea (GR)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 306 days.

(21) Appl. No.: 15/941,269

(22) Filed: Mar. 30, 2018

(65) Prior Publication Data

US 2019/0302871 A1 Oct. 3, 2019

(51) Int. Cl.
*G06F 1/32* (2019.01)
*G06F 1/3234* (2019.01)

(52) U.S. Cl.
CPC .................. *G06F 1/3243* (2013.01)

(58) Field of Classification Search
CPC ..................... G06F 1/26; G06F 1/32
See application file for complete search history.

(56) References Cited

U.S. PATENT DOCUMENTS

| | | | | |
|---|---|---|---|---|
| 9,190,989 | B1* | 11/2015 | Sharda | G06F 1/3293 |
| 9,684,367 | B2* | 6/2017 | Hanssen | G06F 1/3296 |
| 2005/0064829 | A1* | 3/2005 | Kang | H04W 52/028 |
| | | | | 455/127.1 |
| 2007/0226476 | A1* | 9/2007 | Cohen | G06F 9/30181 |
| | | | | 712/245 |
| 2008/0120498 | A1* | 5/2008 | Peterson | G06F 1/26 |
| | | | | 713/2 |
| 2009/0153211 | A1* | 6/2009 | Hendin | G06F 1/22 |
| | | | | 327/198 |
| 2011/0029813 | A1* | 2/2011 | Gunderson | G11C 29/802 |
| | | | | 714/30 |
| 2011/0131427 | A1* | 6/2011 | Jorgenson | G06F 1/324 |
| | | | | 713/300 |
| 2013/0124895 | A1* | 5/2013 | Saha | G06F 1/26 |
| | | | | 713/323 |
| 2014/0019671 | A1* | 1/2014 | Ou | G11C 29/44 |
| | | | | 711/103 |
| 2014/0089714 | A1* | 3/2014 | Pedersen | G06F 1/3243 |
| | | | | 713/324 |

(Continued)

*Primary Examiner* — Phil K Nguyen
(74) *Attorney, Agent, or Firm* — Saile Ackerman LLC; Stephen B. Ackerman

(57) ABSTRACT

A low power microcontroller that includes a low power node controller adapted to retrieve data from peripheral devices is presented. The microcontroller contains a state machine coupled to a storage medium, which is adapted to store a set of instructions executable by the state machine. The microcontroller also contains a power domain controller, which is adapted to enable the state machine upon receipt of a notification signal. As an option, the microcontroller contains a plurality of communication controllers for communicating with a plurality of external devices, wherein the power domain controller includes a register which may be read by the state machine to identify a communication controller among the plurality controllers. Also, a method of operating a microcontroller for use with an external device is presented. The method provides a state machine which executes a set of instructions.

17 Claims, 5 Drawing Sheets

(56) References Cited

U.S. PATENT DOCUMENTS

| | | | |
|---|---|---|---|
| 2015/0033047 A1* | 1/2015 | Byun | G06F 1/325 |
| | | | 713/320 |
| 2015/0039916 A1* | 2/2015 | Case | G06F 1/263 |
| | | | 713/310 |
| 2015/0095681 A1* | 4/2015 | Jouin | G06F 1/3243 |
| | | | 713/323 |
| 2016/0321183 A1* | 11/2016 | Govindan | G06F 12/0862 |
| 2017/0060224 A1* | 3/2017 | Cao | G06F 1/3275 |
| 2017/0075408 A1* | 3/2017 | Banerjee | G06F 1/3287 |
| 2017/0344302 A1* | 11/2017 | Blicharski | G06F 3/0625 |
| 2018/0060085 A1* | 3/2018 | Ananthakrishnan | G06F 1/28 |

\* cited by examiner

| Command | Operand1 | Operand2 | Description |
|---|---|---|---|
| WADAD | Value indicating an Address 1+19=20 bits MSbit=1,Register MSbit=0,RAM | Pointer to RAM/register indicating an Address 1+19 bits MSbit=0,RAM MSbit=1,Register | Store contents of Reg/RAM defined by the pointer in Operand2 into the address defined by the value in Operand1<br><br>Bit27=0:[Operand1]<br>Bit27=1:(Operand1)<br>Bit26=0:(Operand2)<br>Bit26=1:[Operand2] |
| WADVA | Value indicating an Address 1+19=20 bits MSbit=1,Register MSbit=0,RAM | Value 32 bits | Store value in Operand2 into the address defined by the value of Operand1<br><br>Bit27=0:[Operand1]<-Operand2 or<br>Bit27=1:(Operand1)<-(Operand2) |
| TOBRE | Value indicating an Address 1+19=20 bits MSbit=1,Register MSbit=0,RAM | Mask 32 bits | XOR the value with the mask. If mask contains 1 at a specific bit place, then this bit's value is toggled.<br><br>(Operand1)<- (Operand1) XOR Operand2 |
| RDCBI | Value indicating an Address 1+19=20 bits MSbit=1,Register MSbit=0,RAM | Bit place (0 to 31) | Read and compare the contents of Reg/RAM defined by the value of Operand1 with "1" at the bit place<br><br>If (Operand1):(Operand2)=1 then EQUALHIGH_FLAG=True |

FIG. 3A

| Command | Operand1 | Operand2 | Description |
|---|---|---|---|
| RDCGR | Value indicating an Address<br>1+19=20 bits<br>MSbit=1,Register<br>MSbit=0,RAM | Value indicating an Address<br>1+19=20 bits<br>MSbit=1,Register<br>MSbit=0,RAM | Compare contents residing in the Address defined by Operand1 with contents residing in the Address defined by Operand2<br><br>IF (Operand1) > (Operand2) then GREATERVAL_FLAG=True |
| COBR | Value indicating a RAM Address<br>20 bits | Branch according to EQUALHIGH_FLAG or GREATERVAL_FLAG or<br>For a specific number of times | ○ If Operand2=0x0A, then branch to (Operand1) address if EQUALHIGH_FLAG=True<br>○ If Operand2=0x1A, then branch to [Operand1] address if EQUALHIGH_FLAG=True<br>○ If Operand2=0x05, then branch to (Operand1) address if GREATER_FLAG=True<br>○ If Operand2=0x15, then branch to [Operand1] address if GREATER_FLAG=True<br>○ If Operand2=0b1yyyyyyy, then branch to (Operand1) address for up to 128 times |
| INC | Value indicating a RAM Address<br>20 bits | None | (Operand1) <- (Operand1) + 1 |
| DEL | Value indicating a number of clock ticks<br>8 bits | None | Starts a delay of <Operand1> ticks, where a tick is an internal 8-bit timer running on the sleep clock (32KHz). After timer expires, program execution continues. |
| SLP | None | None | Designates the end of the execution. Will automatically generate a signal pulse to the Power Domains Controller to set the system in sleep and power down the Sensor Controller |
| NOP | None | None | No Operation |

FIG. 3B

LOW POWER MICROCONTROLLER

TECHNICAL FIELD

The present disclosure relates to a low power microcontroller. In particular the present disclosure relates to a low power microcontroller that includes a low power node controller adapted to retrieve data from peripheral devices.

BACKGROUND

Connected devices such as Internet of Things (IoT) devices are usually provided with one or more microcontroller (MCU) connected to a plurality of peripheral devices which depending on the application can include various types of sensors. Such microcontrollers need to be periodically activated to acquire data from the peripheral devices, update an internal memory and eventually process the data to provide a meaningful information to the user. For example, in a smart watch, the microcontroller can process data from a variety of sensors to provide a heart rate, a number of steps and a number of calories.

As sensor technology continues to mature, a greater number of sensor chips can be connected to the microcontroller. As a result, the microcontroller's average power dissipation increases.

SUMMARY

It is an object of the disclosure to address one or more of the above-mentioned limitations.

According to a first aspect of the disclosure, there is provided a microcontroller for use with an external device; the microcontroller comprising a state machine coupled to a storage medium; the storage medium being adapted to store a set of instructions executable by the state machine; and a power domain controller, the power domain controller being adapted to enable the state machine upon receipt of a notification signal.

Optionally, the microcontroller comprises a processor coupled to the state machine, wherein the state machine comprises a first power domain and wherein the processor comprising a second power domain; and wherein the power domain controller is coupled to the first power domain and the second power domain.

Optionally, the storage medium comprises a third power domain; and wherein the power domain controller is coupled to the third power domain.

Optionally, the power domain controller is adapted to send a first signal to the first power domain to enable the state machine.

Optionally, the microcontroller comprises a notifier coupled to the power domain controller; the notifier being adapted to provide the notification signal to the power domain controller to enable the state machine.

Optionally, the notifier comprises at least one of a timer and a wake-up controller.

Optionally, the timer is adapted to provide a time period associated with the external device and to send a notification signal to the power domain controller when the time period has expired.

For example, the time period may be a fixed duration or a variable duration. For instance, the time period may be programmable by a user.

Optionally, the microcontroller comprises a terminal adapted to connect the external device to the microcontroller; wherein the wake-up controller is coupled to the terminal and to the power domain controller; the wake-up controller being adapted to receive an alert signal from the external device and to send a notification signal to the power domain controller.

Optionally, the microcontroller comprises a communication controller coupled to the state machine.

Optionally, the set of instructions comprises an instruction to import data from the external device via the communication controller.

Optionally, the set of instructions is adapted to configure the communication controller.

Optionally, the microcontroller comprises a plurality of communication controllers for communicating with a plurality of external devices; wherein the power domain controller comprises a register; the state machine being adapted to read the register of the power domain controller to identify a communication controller among the plurality controllers.

Optionally, the state machine is adapted to identify a subset of instructions by reading the register of the power domain controller.

Optionally, the microcontroller comprises a register coupled to the state machine, the register being adapted to configure the state machine.

Optionally, the set of instructions comprises at least one of an instruction for importing data, comparing data, and storing data.

Optionally, the set of instructions comprises no more than ten instructions.

According to a second aspect of the disclosure, there is provided a system comprising a microcontroller according to the first aspect of the disclosure and one or more external devices.

The system according to the second aspect of the disclosure may comprise any of the features described above in relation to the microcontroller according to the first aspect of the disclosure.

According to a third aspect of the disclosure, there is provided a method of operating a microcontroller for use with an external device, the method comprising providing a state machine; providing a set of instructions executable by the state machine; generating a notification signal; enabling the state machine using the notification signal; and executing the set of instructions.

Optionally, the set of instructions comprises a plurality of subsets; the method comprising identifying a subset of instructions.

Optionally, the set of instructions comprises at least one of an instruction for importing data, comparing data, and storing data.

The method according to the third aspect of the disclosure may share features of the first and second aspects as noted above and herein.

BRIEF DESCRIPTION OF THE DRAWINGS

The disclosure is described in further detail below by way of example and with reference to the accompanying drawings, in which:

FIG. 3A and FIG. 3B are a set of instructions for use with the microcontroller of FIG. 1 or 2;

DESCRIPTION

Figure 1:
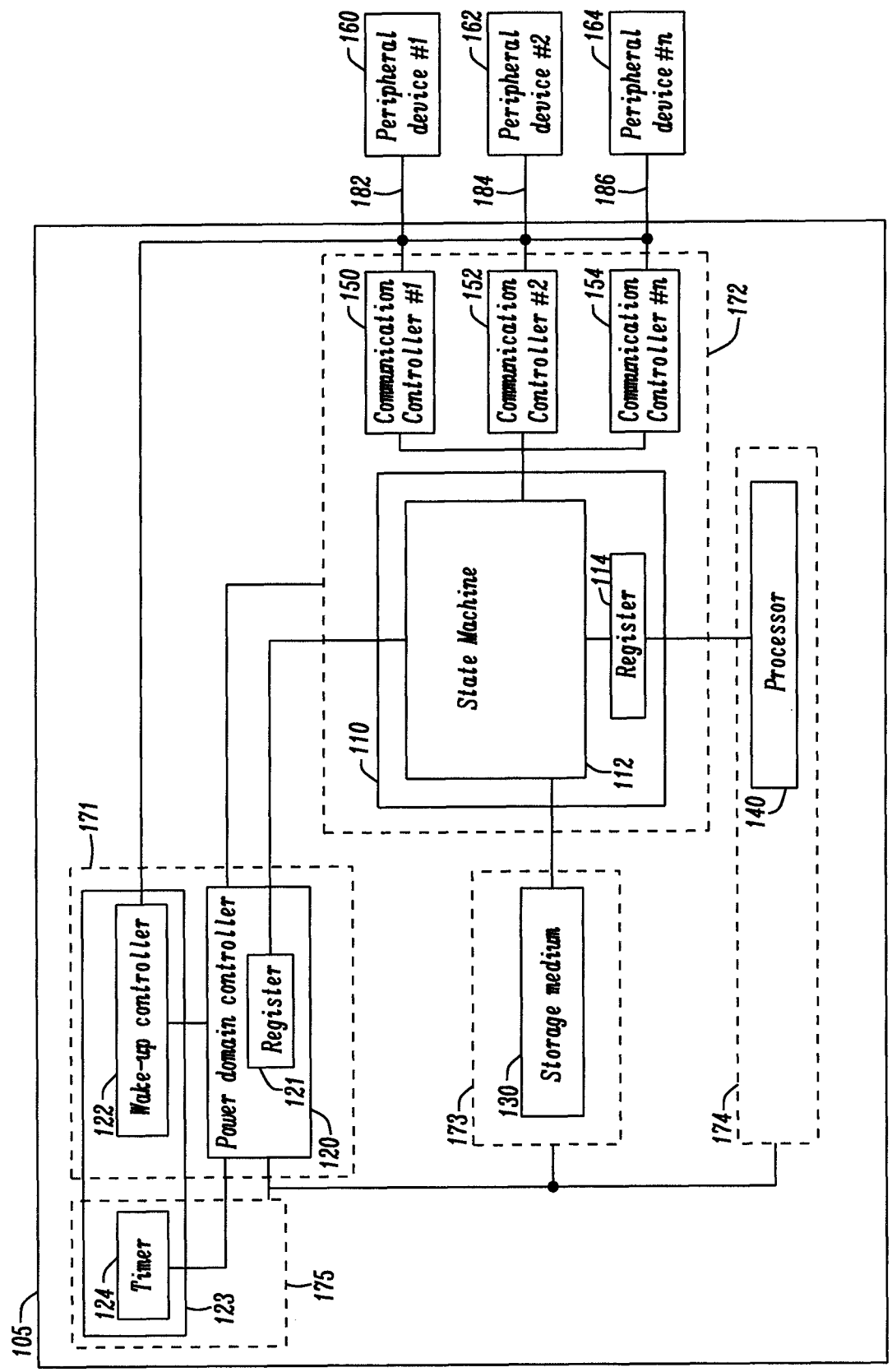
FIG. 1 is a system on chip that includes a microcontroller coupled to a plurality of peripheral devices.

FIG. 1 illustrates a system 100 that includes a microcontroller 105 also referred to as System-on-Chip (SoC), coupled to a plurality of peripheral devices 160, 162 and 164.

The microcontroller 105 includes a node controller 110 coupled to a power domain controller 120, a storage medium 130, a processor 140, and a plurality of communication controllers 150, 152, 154. The power domain controller 120 is coupled to a notifier 123 for providing a notification signal. The notifier 123 may be formed by a wake-up controller 122 or by a timer 124, or a combination of both. The wake-up controller 122 can be connected to the peripheral devices to allow enablement of the node controller 110 using an external signal. The power domain controller may include a register 121.

A peripheral device may be a sensor for sensing a parameter or a device storing or generating data which may need to be retrieved from time to time. For example, a peripheral device may be an accelerometer, a temperature sensor, an optical sensor or any other device capable of sensing or generating data.

The storage medium 130 may be provided by a random access memory (RAM) or a non-volatile storage medium such as a FLASH memory, or any other type of machine-readable storage. The processor 140 may also be referred to as Central Processing Unit CPU.

The communication controllers 150, 152, 154 may be implemented in different ways. A communication controller may be a serial controller or a parallel controller. For example, a communication controller may be a General Purpose Input Output (GPIO); a Serial Peripheral Interface (SPI); a Universal Asynchronous Receiver/Transmitter (UART); an Inter IC (I2C) bus or an Analog to Digital converter (ADC). The number of communication controllers may vary depending on the number and type of peripheral devices required for a particular application.

The microcontroller 105 includes a plurality of power domains also referred to as power islands for operating different areas of the chip at different voltage and frequencies independently from one another. The number of power islands may vary. In this example the microcontroller 105 includes five power domains. A first power island 171 is provided to power the power controller 120 and the wake-up controller 122. A second power island 172 is provided for powering the node controller 110 and the communications controllers 150,152,154. A third power island 173 is provided to power the storage medium 130. A fourth power island 174 is provided for powering the processor 140. Optionally, a fifth power island 175 may be provided for powering the timer 124. Each power island may have a particular rail voltage. The power domain controller 120 is coupled to each one of the power islands 172, 173, 174 and 175. In different embodiments, the number of power island may vary. For instance, the microcontroller may have only three separate power islands.

The node controller 110 includes a state machine 112, also referred to as finite-state machine (FSM) coupled to a register 114. The state machine 112 is coupled the storage medium 130 and to the plurality of communication controllers 150, 152 and 154. The register 114 may be coupled to the state machine 112 and to the processor 140. Optionally, the microcontroller may include one or more internal buses, also referred to as local buses. For instance, the state machine 112 may be coupled to the communications controllers via an internal bus. The register 114 may be used to configure the state machine 112. The register 114 may also be used to provide information regarding the status of the state machine while the node controller 110 is operating.

The state machine 112 may be formed by a plurality of memory elements such as latches, and flip flops coupled to logic gates. The state machine may be customized to execute specific commands of the microcode. Since the microcode is limited to a small number of commands, the state machine can be implemented with a relatively small number of states. This reduces the footprint of the state machine, allowing the implementation of a compact node controller. In operation, the state machine 112 transits between different states as it executes the commands of the microcode.

The microcontroller 105 may be provided with a plurality of terminals also referred to as pins for connecting the peripheral devices to the communication controllers. In this example the microcontroller has a first terminal 182 connected to the communication controller 150, a second terminal 184 connected to the communication controller 152, and a third terminal 186 connected to the communication controller 154. The wake-up controller 122 may be coupled to one or more terminal. For instance, the wake-up controller 122 may be coupled to the terminals 182, 184 and 186.

On initialisation of the microcontroller 105, the power domain controller 120 enables the power domains. Then depending on the application, the power domain controller 120 may disable one or more power domains. Then, the power domain controller 120 may enable the power domains 172, 173 and 174 only when a set of instructions stored in the storage medium 130 must be executed by the state machine 112.

A peripheral device may be adapted to perform an interrupt request (IRQ) to initiate a hardware interrupt, that is a signal indicating the device requires attention, to the wake-up controller 122. For instance, a peripheral device may send a signal to the wake-up controller 122 when it needs to transmit data to the storage medium 130. The wake-up controller 122 then sends a signal to the power domain controller 120 to enable the second and third power domains 172 and 173. Upon activation of the node controller 110, the state machine 112 starts executing the set of instructions also referred to as microcode stored in the storage medium 130. The microcode may include different segments or subsets of instructions for different peripheral devices.

The power domain controller 120 may send a trigger signal to the node controller 110 to start executing the microcode. Upon reception of the trigger signal the node controller 110 may read the register 121 of the power domain controller 120 to identify which peripheral device generated the trigger event. The state machine 112 then identifies a particular segment of code to be executed corresponding to the peripheral device identified. Then the state machine 112 can start executing the particular segment of code.

For instance, the peripheral device 162 may be a sensor having a RAM memory that is full and needs to be emptied to avoid overwriting. The peripheral device 162 then initiates an interrupt to the wake-up controller 122. The wake-up controller 122 sends a signal to the power domain controller 120 which in turn enable the power domains 172 and 173. The power domain controller 120 may also sends an identification signal to the state machine 112 pointing to a segment of code associated with the peripheral device 162.

The set of instructions present in the microcode may be adapted to configure one or more communication controllers. The set of instructions present in the microcode can be used to perform different tasks such as importing data from a peripheral device to the storage medium 130 by configuring one or more of the communication controllers 150, 152, 154. Other operations may include comparing data stored in the storage medium 130 with data stored in the register 114.

The data stored in a peripheral device may be imported at some specific time intervals. For instance, the data stored in peripheral device 160 may be imported at a first time interval, for example every 10 minutes; and the data stored in the peripheral device 164 may be imported at a second time interval, for instance every two days. A time interval may be an internal parameter of the peripheral device or a programmable value provided by a user of the device 105.

As mentioned above the microcontroller 105 may be provided with a timer 124. The timer 124 can be used to send a wake-up signal to the power domain controller 120 when a time interval associated with a peripheral device has expired. Upon receipt of the wake-up signal from the timer 124, the power domain controller 120 enables the second and third power domains 172 and 173, and may send an identification signal to the state machine 112. For example, if a first time interval corresponding to the peripheral device 160 has expired, the timer sends a wake-up signal to the power domain controller 120 which in turn sends an identification signal identifying the peripheral device 160. The state machine reads the commands from the storage medium 130, where the microcode is stored, and executes the commands sequentially by transiting to the required states; depending on the command.

In this way, the node controller 110 is only enabled when required. In addition, the node controller can perform a particular task autonomously without having to wake up the other components of the System-on-Chip. For instance, the sensor node controller 110 may import data from a peripheral device without having to enable the processor 140. This reduces power consumption.

Once the storage medium 130 has been updated, the node controller 110 may generate an interrupt request (IRQ) to the processor 140 and also send a signal to the power domain controller 120, to enable the power island 174. In this way, the processor 140 can process the data stored in the storage medium 130 and provide information to the user.

The microcode may include a short set of instructions or commands. For instance, the microcode may have less than ten commands. The list of instructions may be used by the state machine 112 to create a program for manipulating the relevant communication controller while dissipating a relatively low amount of power. Manipulating a communication controller may include enabling, disabling and configuring the communication controller. The set of instructions may be used for sampling the status of the peripheral device; also referred to as polling. It may also be used to compare values present in the register 114 with values present in the storage medium 130 and to transfer data from a peripheral device to the storage medium 130.

The set of instructions may include a branch instruction that causes the state machine 112 to start executing a different set of instructions. The set of instructions may also include a termination command to terminate the execution and to notify the power domain controller 120 that the power domains in use can be switched off. For example, execution of the termination command may cause the state machine 112 to send a signal to the power domain controller 120 to switch off a plurality of power domains, including the power domain 172 of the node controller 110, hence reducing power consumption.

Figure 2:
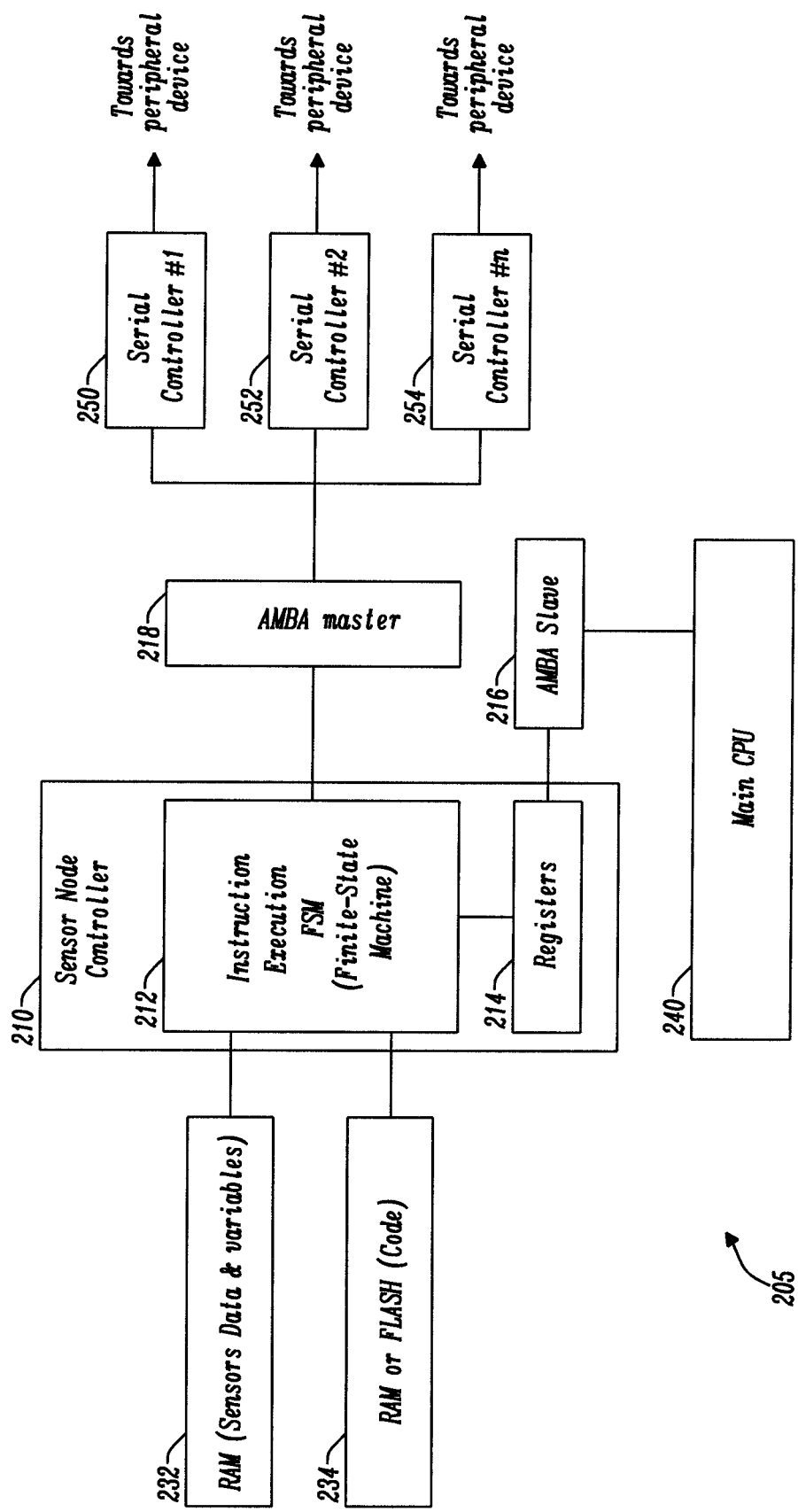
FIG. 2 is an exemplary embodiment of a microcontroller.

FIG. 2 illustrates an exemplary embodiment of a microcontroller, also referred to as System-on-Chip 205. For clarity the power islands, the power domain controller and the wake-up controller have not been represented but would be part of the microcontroller.

The microcontroller or SoC 205 includes a sensor node controller 210 coupled to a power domain controller (not shown), a first storage medium 232, a second storage medium 234, a processor 240, and a plurality of serial controllers 250, 252, 254. The first and second storage devices 232, 234 may be provided by a random access memory (RAM) or a non-volatile storage medium such as a FLASH memory. A code, also referred to as microcode containing a short set of instructions, may be stored in the first storage medium 232 or the second storage medium 234.

The sensor node controller 210 includes a state machine 212, and a storage medium such as a register 214. A first internal processor bus 216, also referred to as slave bus is provided for communicating with the processor 240. A second internal processor bus 218, also referred to as master bus is provided for communicating with the plurality of serial controllers 250, 252 and 254. For example, the slave and master buses 216 and 218 may be provided by an Advanced Microcontroller Bus Architecture, AMBA', internal bus.

The state machine 212 is coupled to the first and second memories 232, 234, to the register 214 and to the master bus 218. The slave bus 216 is coupled to the register 214 and to the processor 240. The slave and master buses 216 and 218 may be configured by the CPU 240 and can be used to facilitate communication between different types of controllers and the state machine 212.

FIGS. 3A and 3B list a set of instructions which may form part of a microcode. In this example ten commands are provided allowing the state machine 112 to perform different tasks. A command corresponds to a task that is described in the column labelled "description". A task may refer to one or more operand, for instance a first and a second operand labelled Operand 1 and Operand 2. For example, the command WADAD may be used to store the content of a storage medium defined by a pointer in Operand 2 into the address defined by a value of Operand 1.

In FIGS. 3A and 3B the operand may be shown either between simple brackets (Operand) or between square brackets [Operand]. When in simple brackets, then the Operand's value is an address to either System RAM or a Register (direct addressing). When in square brackets, then the Operand's value is a pointer to a memory space in which the requested address resides (indirect addressing).

Figure 4:
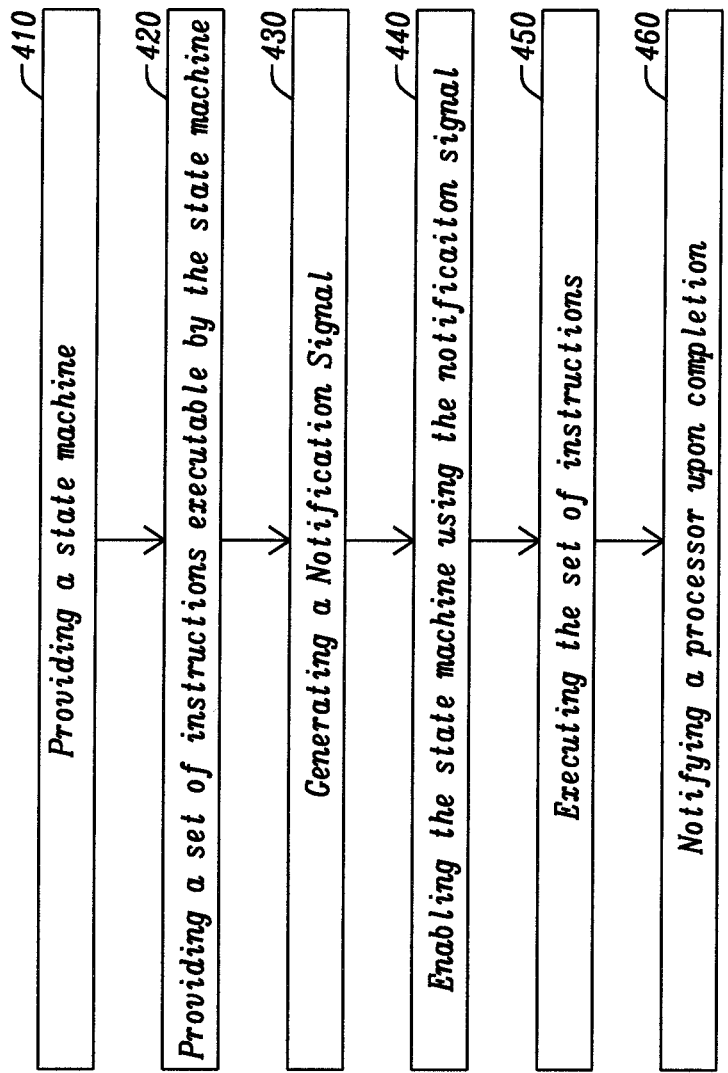
FIG. 4 is a flow diagram of a method for operating a microcontroller.

FIG. 4 illustrates a flow diagram of a method of operating a microcontroller for use with one or more external devices. At step 410 a state machine is provided. At step 420 a set of instructions executable by the state machine is provided. At step 430 a notification signal is generated. At step 440 the state machine is enabled using the notification signal. At step 450 the set of instructions is executed by the state machine. At step 460 a processor is notified upon completion.

For instance, the set of instructions may enable the state machine to retrieve data from an external device and store the data in a storage medium. Once the data have been retrieved and stored, the state machine may send a signal to the processor to notify that the data stored in the storage medium have been updated.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

What is claimed is:

1. A microcontroller for use with an external device; the microcontroller comprising
   a state machine configured to retrieve data from the external device;
   a communication controller coupled to the state machine;
   a storage medium adapted to store a set of instructions executable by the state machine, the set of instructions comprising an instruction to import data from the external device via the communication controller; and
   a power domain controller adapted to enable the state machine upon receipt of a notification signal;
   wherein the microcontroller comprises a plurality of communication controllers for communicating with a plurality of external devices;
   wherein the power domain controller comprises a register, the state machine being adapted to read the register of the power domain controller to identify a communication controller among the plurality of communication controllers.

2. The microcontroller as claimed in claim 1, comprising a processor coupled to the state machine, wherein the state machine comprises a first power domain and wherein the processor comprising a second power domain; and wherein the power domain controller is coupled to the first power domain and the second power domain.

3. The microcontroller as claimed in claim 2, wherein the storage medium comprises a third power domain; and wherein the power domain controller is coupled to the third power domain.

4. The microcontroller as claimed in claim 2, wherein the power domain controller is adapted to send a first signal to the first power domain to enable the state machine.

5. The microcontroller as claimed in claim 1, comprising a notifier coupled to the power domain controller; the notifier being adapted to provide the notification signal to the power domain controller to enable the state machine.

6. The microcontroller as claimed in claim 5 wherein the notifier comprises at least one of a timer and a wake-up controller.

7. The microcontroller as claimed in claim 6, wherein the timer is adapted to provide a time period associated with the external device and to send a notification signal to the power domain controller when the time period has expired.

8. The microcontroller as claimed in claim 6, comprising a terminal adapted to connect the external device to the microcontroller; wherein the wake-up controller is coupled to the terminal and to the power domain controller; the wake-up controller being adapted to receive an alert signal from the external device and to send a notification signal to the power domain controller.

9. The microcontroller as claimed in claim 1, wherein the set of instructions is adapted to configure the communication controller.

10. The microcontroller as claimed in claim 1, wherein the state machine is adapted to identify a subset of instructions by reading the register of the power domain controller.

11. The microcontroller as claimed in claim 1, comprising another register coupled to the state machine, the said another register being adapted to configure the state machine.

12. The microcontroller as claimed in claim 1, wherein the set of instructions comprises at least one of an instruction for importing data, comparing data, and storing data.

13. The microcontroller as claimed in claim 1, wherein the set of instructions comprises no more than ten instructions.

14. A system comprising a microcontroller as claimed in claim 1 and one or more external devices.

15. A method of operating a microcontroller for use with an external device, the method comprising the steps of:
   providing a state machine configured to retrieve data from the external device;
   providing a communication controller coupled to the state machine;
   providing a set of instructions executable by the state machine, the set of instructions comprising an instruction to import data from the external device via the communication controller;
   generating a notification signal;
   enabling the state machine using the notification signal; and
   executing the set of instructions;
   wherein the microcontroller comprises a plurality of communication controllers for communicating with a plurality of external devices;
   wherein the power domain controller comprises a register, the state machine being adapted to read the register of the power domain controller to identify a communication controller among the plurality of communication controllers.

16. The method as claimed in claim 15, wherein the set of instructions comprises a plurality of subsets; the method further comprising the step of: identifying a subset of instructions.

17. The method as claimed in claim 15 wherein the set of instructions
   comprises at least one of an instruction for importing data, comparing data, and storing data.

* * * * *